United States Patent
Colletti

(10) Patent No.: US 7,963,298 B2
(45) Date of Patent: Jun. 21, 2011

(54) SPHERICAL TUBE END FORM FOR A FLUID CONNECTION SYSTEM

(75) Inventor: Michael J. Colletti, Churchville, NY (US)

(73) Assignee: Delphi Technologies, Inc., Troy, MI (US)

( * ) Notice: Subject to any disclaimer, the term of this patent is extended or adjusted under 35 U.S.C. 154(b) by 839 days.

(21) Appl. No.: 11/998,568

(22) Filed: Nov. 30, 2007

(65) Prior Publication Data
US 2009/0139594 A1 Jun. 4, 2009

(51) Int. Cl.
*F16L 11/00* (2006.01)

(52) U.S. Cl. ..... 138/109; 138/177; 285/366; 72/370.11; 123/468

(58) Field of Classification Search ................. 138/109; 123/468, 469; 72/370.11; 285/366
See application file for complete search history.

(56) References Cited

U.S. PATENT DOCUMENTS

| | | | |
|---|---|---|---|
| 5,172,939 A * | 12/1992 | Hashimoto | 285/24 |
| 5,667,255 A * | 9/1997 | Kato | 285/133.4 |
| 5,957,507 A * | 9/1999 | Asada | 285/189 |
| 6,135,091 A | 10/2000 | Itoh et al. | |
| 6,497,220 B1 * | 12/2002 | Boecking | 123/469 |
| 6,595,558 B2 * | 7/2003 | Kusanagi | 285/382 |
| 6,746,056 B2 * | 6/2004 | Palmer | 285/261 |
| 6,824,173 B2 * | 11/2004 | Usui | 285/353 |
| 6,840,283 B2 * | 1/2005 | Furugen et al. | 138/109 |
| 6,935,377 B2 * | 8/2005 | Furugen | 138/109 |
| 7,213,576 B2 * | 5/2007 | Furugen | 123/468 |
| 7,562,648 B1 * | 7/2009 | Wagner et al. | 123/468 |
| 7,735,473 B2 * | 6/2010 | Kato et al. | 123/468 |
| 2003/0230349 A1 * | 12/2003 | Furugen et al. | 138/109 |
| 2004/0135368 A1 * | 7/2004 | Furugen | 285/259 |
| 2004/0256014 A1 * | 12/2004 | Kato | 138/109 |
| 2006/0042710 A1 * | 3/2006 | Furugen | 138/109 |
| 2006/0284421 A1 * | 12/2006 | Fonville et al. | 285/386 |

FOREIGN PATENT DOCUMENTS

| | | |
|---|---|---|
| DE | 19936685 | 2/2001 |
| DE | 102004013138 | 10/2005 |
| EP | 1621760 | 2/2006 |
| JP | 2002/089404 | 3/2002 |
| WO | 2007/105660 | 9/2007 |

OTHER PUBLICATIONS

EP Search Report dated Jan. 22, 2010.

* cited by examiner

*Primary Examiner* — Patrick F Brinson
(74) *Attorney, Agent, or Firm* — Thomas N. Twomey

(57) ABSTRACT

A fluid distribution pipe includes an elongate tubular body and a spherical end form integral with the tubular body at an inlet end. The spherical fluid connection end of the fuel rail is formed by plastic deformation. A series of tools and motions is used while the tubing of the fuel rail is clamped in place to form the spherical end form at the inlet end of the tubing. The resulting spherical end form provides the necessary geometry and surface finish to provide a successful seal and flexible connection of the fuel rail with a fuel line with significant cost advantages over current prior art methods.

17 Claims, 1 Drawing Sheet

US 7,963,298 B2

SPHERICAL TUBE END FORM FOR A FLUID CONNECTION SYSTEM

TECHNICAL FIELD

The present invention relates to engine management systems and components of internal combustion engines; more particularly, to fuel injection systems; and most particularly, to an apparatus and method for connecting a fuel rail to a fuel line.

BACKGROUND OF THE INVENTION

It is generally known in the art of internal combustion engine design to use fuel rails to deliver fuel to individual fuel injectors. A fuel rail is essentially an elongated tubular fuel manifold connected at an inlet end to a fuel supply system and having a plurality of ports for mating in any of various arrangements with a plurality of fuel injectors to be supplied. Typically, a fuel rail assembly includes a plurality of fuel injector sockets in communication with the fuel rail, the injectors being inserted into the sockets and held in place in an engine head by bolts securing the fuel rail assembly to the head. Fuel rail assemblies are typically used on internal combustion engines with multi-point fuel injection systems.

Gasoline fuel injection arrangements may be divided generally into multi-port fuel injection (MPFI), wherein fuel is injected into a runner of an air intake manifold ahead of a cylinder intake valve, and direct injection (DIG), wherein fuel is injected directly into an engine cylinder, typically during or at the end of the compression stroke of the piston. Diesel fuel injection (DID) is also a direct injection type.

For purposes of clarity and brevity, wherever DIG is used herein it should be taken to mean both DIG and DID, and fuel rails in accordance with the invention as described below are useful in both DIG and DID engines.

DIG fuel rails assemblies require high precision in the placement of the fuel rail relative to the fuel line that delivers pressurized fuel from a fuel tank to the fuel rail because the spacing and orientation of the sockets along the fuel rail assembly must exactly match the three-dimensional spacing and orientation of the fuel injectors as installed in cylinder ports in the engine. A stiff fuel line to fuel rail connection may create undesired stresses in the fuel rail assembly when assembled in an engine head.

Furthermore, a DIG fuel rail assembly must sustain much higher fuel pressures than MPFI fuel rail assemblies to assure proper injection of fuel into a cylinder having a compressed charge. For example, DIG fuel rails may be pressurized to 100 atmospheres or more, whereas MPFI fuel rails must sustain pressures of only about 4 atmospheres. Accordingly, a tight seal is needed, for example, at the fuel line to fuel rail connection.

Efforts to provide a sealed fuel rail to fuel line connection included, for example, a spherical fuel rail inlet. Currently, such spherical fuel rail inlet is achieved by machining a sleeve that has one end formed as a ball, by gradually reducing the diameter of a fuel rail inlet, by press fitting the sleeve onto the reduced diameter section of the fuel rail inlet, and by creating a braze joint to ensure attachment of the sleeve to the fuel rail. While the ball of the sleeve enables a sealed connection of the fuel rail to the fuel line, multiple parts and assembly processes are needed to achieve this. Multiple parts and assembly steps create extra cost and cycle time. Also, metal forming and brazing processes can produce significant stresses in the formed or joint parts that are undesirable.

What is needed in the art is a simple and inexpensive sealed connection of a fuel rail to a fuel line.

It is a principal object of the present invention to provide a spherical fluid connection end integral with a fuel rail that is formed by plastic deformation of an inlet end of the fuel rail.

SUMMARY OF THE INVENTION

The present invention successfully addresses the shortcomings of the prior art by providing a fuel rail having an inlet that is formed as a sphere. The spherical fluid connection end of the fuel rail is formed by plastic deformation. A series of tools and motions are used while the tubing of the fuel rail is clamped in place to form the spherical end form at the inlet end of the tubing. The resulting spherical end form provides the necessary geometry and surface finish to provide a successful seal and flexible connection of the fuel rail with a fuel line with significant cost advantages over current prior art methods.

By forming the sphere directly in the tubing at an inlet end of the fuel rail, separate prior art components and several associated machining and assembly processes are eliminated. For example, the machined ball/sleeve component, the associated machining operations, and wash processes are eliminated. The prior art tube end reduction, the press operation, as well as the application of braze and brazing of the joint between the fuel rail and the ball/sleeve component are eliminated as well. An inner and an outer tool may be used concurrently for forming the spherical end form of the fuel rail.

A nut with internal threads will fit behind the spherical end form on the fuel rail. By tightening the nut, the outer surface of the spherical end form of the fuel rail and the inner surface of a conical mating end form of a fuel line will meet and seal.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 2:
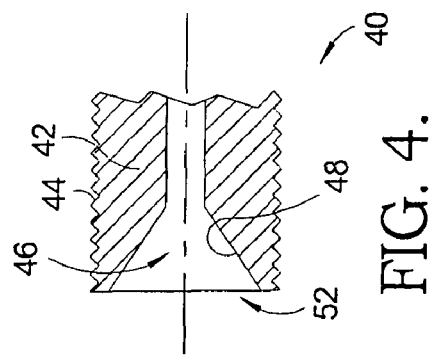
FIG. 2 is an elevational front view of an end form of the fuel rail end portion in accordance with the invention.
Figure 4:
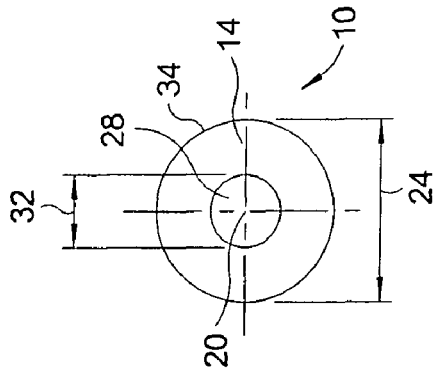
FIG. 4 is an elevational cross-sectional view of an end portion of a fuel line in accordance with the invention.
Figure 1:
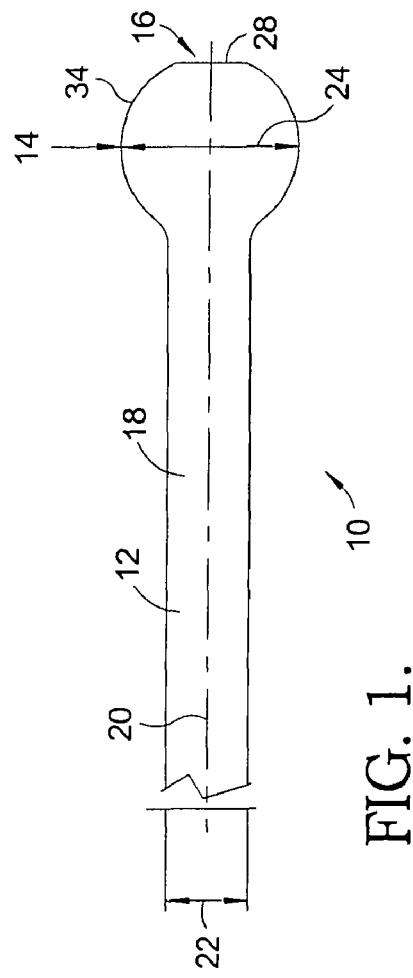
FIG. 1 is an elevational side view of an end portion of a fuel rail in accordance with an embodiment of the invention.
Figure 3:
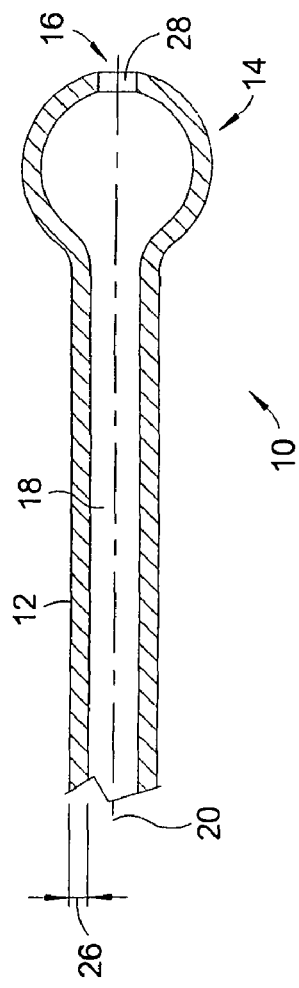
FIG. 3 is an elevational cross-sectional view of the fuel rail end portion in accordance with the invention.

Referring to FIGS. 1-3, an end portion of a fuel rail 10 includes tubular body 12 having an integral spherical end form 14 at an inlet end 16. Tubular body 12 and spherical end form 14 are a single integral part. Tubular body 12 extends axially along an axis 20. Tubular body 12, and therefore fuel rail 10, has an internal volume 18 that receives fuel, possibly highly pressurized fuel in the case of application in a direct injection fuel system, from a fuel line 40 (as shown in FIG. 4). Accordingly, fuel rail 10 is essentially an elongate fuel manifold. Fuel rail 10 may be any fluid distribution pipe.

Tubular body 12 has an outer diameter 22 that is smaller than an outer diameter 24 of spherical end form 16. Tubular body 12 and spherical end form 14 have a wall thickness 26 that is preferably uniform as illustrated in FIG. 3.

Spherical end form 14 includes a central opening 28 that serves as an inlet for a fluid, such as fuel. As illustrated in FIG.

2, axis 20 goes through the center of opening 28. Central opening 28 has a diameter 32 that is preferably smaller than outer diameter 22 of tubular body 12. Spherical end form 14 further includes an outer surface 34 that is shaped like a ball.

Referring to FIG. 4, an end portion of a fuel line 40 includes a section 42 for connection to fuel rail 10. Section 42 includes external threads 44 and a conical end form 46 at an outlet end 52 for mating with spherical end form 14 of fuel rail 12. Conical end form 46 has an inner surface 48. Tightening a nut (not shown) that fits behind cylindrical end form 14 and that has internal threads that match external threads 44 of fuel line 40 brings outer surface 34 of spherical end form 14 of fuel rail 10 in contact with inner surface 48 of conical end form 46 of fuel line 40 and creates a circular seal where outer surface 34 meets inner surface 48. Central opening 28 incorporated in spherical end form 14 enables fluid communication between fuel line 40 and fuel rail 10. Fuel line 40 may be, but is not limited to, a pressurized fuel delivery line. Fuel line 40 may be any fluid delivery line.

Spherical end form 14 is preferably formed by plastic deformation, for example by cold forming, using a succession of tools and motions while tubular body 12 is hold in place. In a first step, material of tubular body 12 at inlet end 16 is spread out. In a following step, an outer tool is used to form the spread out material around an inner tool to create spherical end form 14. In a preferred embodiment, inner tool has the shape of a half circle. Accordingly, a first half of spherical end form 14 is created with the inner tool in a first position. Then a second half of spherical end form 14 is created with the inner tool in a second position. The spread out material is formed around the inner tool such that central opening 28 is created concurrently with spherical end form 14. Consequently, no secondary machining operations are needed to form central opening 28 and, therefore, the fuel inlet of fuel rail 10. The plastic deformation of the material of tubular body 12 and the application of a series of tools and motions enables to achieve not only a desired geometry of spherical end form 14 but also a needed surface finish of outer surface 34 of spherical end form 14 to provide a successful seal with mating section 43 of fuel line 40. Accordingly, the present invention as described above has significant cost advantages over prior art fuel rail to fuel line connections.

While fuel rail 10 with integral spherical end form 14 may be most advantageous in direct injection fuel systems, application of fuel rail 10 is not limited to applications in direct injection fuel systems.

While spherical end form 14 integral with tubular body 14 has been described above for applications in a fuel injection system of an internal combustion engine, applications are not limited to fuel injection systems and may be expanded to any fluid connection system.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A fluid distribution pipe, comprising:
an elongate tubular body; and
a spherical end form integral with said tubular body and defining a spherical chamber;
wherein said spherical end form is formed at an inlet end of said tubular body; and
wherein the entirety of said chamber is available to receive a fluid.

2. The fluid distribution pipe of claim 1, wherein said tubular body has an internal volume that receives said fluid via said spherical end form.

3. The fluid distribution pipe of claim 2, wherein said fluid is pressurized.

4. The fluid distribution pipe of claim 1, wherein said tubular body has an outer diameter that is smaller than an outer diameter of said spherical end form.

5. The fluid distribution pipe of claim 1, wherein said tubular body and said spherical end form have a wall thickness that is uniform.

6. The fluid distribution pipe of claim 1, wherein said spherical end form includes a central opening and wherein said central opening is an inlet for said fluid.

7. The fluid distribution pipe of claim 1, wherein said spherical end form includes an outer surface that mates with an inner surface of a conical end form of a fluid delivery pipe creating a circular seal.

8. The fluid distribution pipe of claim 7, wherein said fluid delivery pipe is a fuel line.

9. The fluid distribution pipe of claim 1, wherein said fluid distribution pipe is a fuel rail.

10. The fluid distribution pipe of claim 1, wherein said spherical end form is formed by plastic deformation.

11. A fluid connection system, comprising:
a single part fluid distribution pipe including an elongate tubular body and an integral spherical end form at an inlet end which defines a spherical chamber; and
a fluid delivery pipe including a conical end form at an outlet end;
wherein said spherical end form mates with said conical end form creating a circular seal;
wherein the entirety of said chamber is available to receive a fluid.

12. The fluid connection system of claim 11, wherein said fluid delivery pipe includes external threads, and wherein a nut that fits behind said cylindrical end form and that includes internal threads that match said external threads brings said spherical end form in contact with said conical end form.

13. The fluid connection system of claim 11, wherein said seal is formed where an outer surface of said cylindrical end form contacts an inner surface of said conical end form, and wherein said seal is a circular seal.

14. The fluid connection system of claim 11, wherein said fluid distribution pipe is a fuel rail, and wherein said fuel delivery pipe is a fuel line of an internal combustion engine.

15. The fluid connection system of claim 11, wherein said fluid distribution pipe is a fuel rail and wherein said fuel delivery pipe is a high pressure fuel line of a direct injection system of an internal combustion engine.

16. The fluid distribution pipe of claim 1 wherein said tubular body has an internal volume with an internal volume inside diameter and said chamber has a chamber inside diameter that is larger than said internal volume inside diameter.

17. The fluid connection system of claim 11 wherein said tubular body has and internal volume with an internal volume inside diameter and said chamber has a chamber inside diameter that is larger than said internal volume inside diameter.

* * * * *